Figures 1, 2, 3, 4, 5, 6, 7, 8:
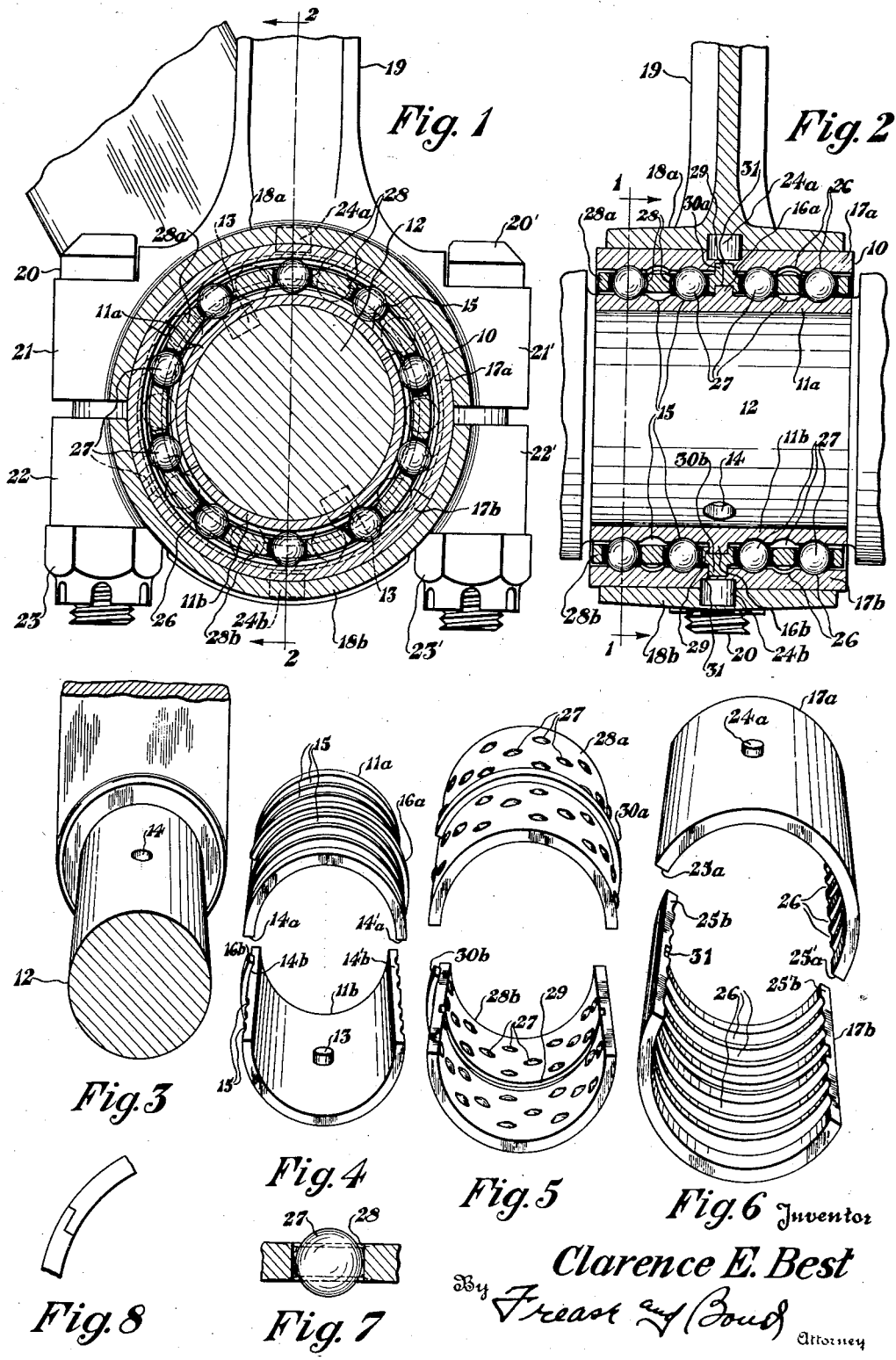

Sept. 1, 1931. C. E. BEST 1,821,873
SEPARABLE ANTIFRICTION BEARING
Filed March 6, 1928

Inventor
Clarence E. Best
By Freast and Bond
Attorney

Patented Sept. 1, 1931

1,821,873

UNITED STATES PATENT OFFICE

CLARENCE E. BEST, OF CANTON, OHIO

SEPARABLE ANTIFRICTION BEARING

Application filed March 6, 1928. Serial No. 259,416.

My invention relates to anti-friction bearings whose cylindric members are formed of separable semi-cylindric parts for fitting about portions of shafts such as line shafts and crank shafts which are incapable of having the usual integral cylindric members of anti-friction bearings applied thereto.

Bearings of this type may include one or more raceways formed on the outer surface of an inner raceway sleeve comprising separable semi-sleeves adapted to be secured upon a shaft which may be for example the crank pin of a crank shaft, one or more outer raceways formed on the inner surface of an outer raceway sleeve comprising separable semi-sleeves adapted to be secured between the separable portions of a bearing block which may constitute a connecting rod end, each of the inner raceways opening outwardly and each of the outer raceways opening inwardly, and a set of rolling members rolling in and interposed between each pair of opposite raceways, the rolling members being, as desired, balls, cylindric rollers, or tapered rollers, and a cage associated with the rolling members for properly spacing them from each other circumferentially, and laterally when more than one set is used.

Such bearings as heretofore constructed have not been satisfactory in use because of a failure to meet one or more requirements found desirable and necessary by experience and experiment.

According to such experience and experiment, it has been found that in bearings of this type, the several parts should be easily made and easily fitted with each other, and at the same time the several joints in the separable raceway sleeves and the separable bearing block, should be associated with each other in such manner that the connecting surfaces of the raceways are maintained in proper fit and alinement so that the rolling members roll easily across the joints.

Moreover, it has been found that the cage for the rolling members should be circumferentially movable with respect to the outer and inner raceway sleeves, but should be prevented from any movement longitudinal of the axis of the shaft or crank pin.

Accordingly, the objects of the present improvements include the provision of a separable anti-friction bearing which meets the foregoing requirements, and thus overcomes the objectionable features of this type of bearings as heretofore constructed.

These and ancillary objects are attained in the improvements comprising the present invention, as will hereinafter be set forth in detail, and which may be stated in general terms as including means for maintaining the joints of the outer raceway sleeve of a separable anti-friction bearing circumferentially spaced from the points of the separable bearing block in which the outer raceway sleeve is mounted, means for permitting circumferential movement relative to the outer and inner raceway sleeves of the cage for the rolling members of the bearing and preventing movement of the cage longitudinal of the shaft axis, together with details of construction and arrangement, whereby the several bearing parts may be easily made and easily fitted with each other, and whereby for securing in place the entire bearing assembly, there is required only the usual bolts or screws for joining the separable portions of the bearing block.

One embodiment of the improved separable anti-friction bearing is illustrated in the accompanying drawings forming part hereof, in which—

Figure 1 is a fragmentary transverse sectional view as on line 1—1, Fig. 2 of the improved bearing used as a crank pin bearing;

Fig. 2, an axial sectional view thereof as on line 2—2, Fig. 1;

Fig. 3, a fragmentary perspective view of the crank pin before the bearing has been applied thereto;

Fig. 4, perspective views of the separated semi-sleeves for forming the inner raceway sleeve;

Fig. 5, perspective views of the separated semi-cages for the rolling members;

Fig. 6, perspective views of the separated semi-sleeves for forming the outer raceway sleeve;

Fig. 7, a fragmentary sectional view illustrating the method of retaining the rolling members in the cage; and Fig. 8, a detached fragmentary view illustrating a modified overlapping joint between the separable semi-sleeves.

Similar numerals refer to similar parts throughout the several views.

The improved separable anti-friction bearing indicated generally at 10 includes an inner raceway sleeve comprising separable semi-sleeves 11a and 11b, the inner semi-cylindric surfaces of which are continuous with each other and fit about the outer cylindric surface of a crank pin 12.

Each of the semi-sleeves 11a and 11b is provided with a dowel pin 13 projecting inwardly from the inner surface of the semi-sleeve, and adapted for fitting in one of a pair of sockets 14 formed in the outer surface of the crank pin.

The semi-sleeves 11a and 11b are preferably made by longitudinally cutting a tube along any axial plane thereof, and then accurately finishing as by grinding the longitudinally extending base surfaces 14a and 14'a of the semi-sleeve 11a, and the longitudinally extending base surfaces 14b and 14'b of the semi-sleeve 11b, so that the surfaces 14a and 14'a are accurately plane and lie in the same plane, and so that the surfaces 14b and 14'b are accurately plane and lie in the same plane whereby the surfaces 14a and 14'a will accurately abut and fit with the surfaces 14b and 14'b, respectively.

The semi-sleeves 11a and 11b are then clamped in a suitable fixture with the surfaces 14a and 14'a abutting and fitting the surfaces 14b and 14'b, and the inner mutually continuous semi-cylindric surfaces of the semi-sleeves are accurately finished as by grinding to fit upon the crank pin 12.

With the semi-sleeves 11a and 11b still clamped in the fixture, a plurality of laterally spaced outwardly opening annular groove raceways 15 are finished as by grinding in the outer surface of the inner raceway sleeve.

Preferably midway between the ends of the sleeve, outwardly protruding semi-ring flanges or flange tongues 16a and 16b are formed on the semi-sleeves 11a and 11b. One end of each semi-ring flange preferably extends beyond one of its semi-sleeve bases, and the other end preferably terminates short of the other semi-sleeve base a distance equal to the length of the extension. The end on each semi-sleeve extending beyond the base thus is adapted to lap over the other semi-sleeve so that the joints between the flange ends do not occur on the same plane as the abutment of the semi-sleeve bases.

The outer raceway sleeve for the improved bearing 10 comprises separable semi-sleeves 17a and 17b, the outer semi-cylindric surfaces of which are continuous with each other and fit in the inner semi-cylindric surfaces of the separable bearing block halves 18a and 18b, respectively, comprising a bearing block for mounting the bearing. The bearing block half 18a is formed at the end of a connecting rod 19, and the bearing block half 18b is separably connected with the bearing block half 18a in a usual manner as by means of headed bolts 20 and 20' passing respectively through suitable apertures in outwardly extending lugs 21 and 21' on the bearing block half 18a and through similar and registering apertures in outwardly extending lugs 22 and 22' on the bearing block half 18b.

Nuts 23 and 23' respectively are screwed on the threaded ends of the bolts 20 and 20' extending through the lugs 21 and 21'.

The semi-sleeve 17a is provided with a dowel pin 24a projecting outwardly from the outer surface of the semi-sleeve, and adapted for fitting in a socket formed in the inner surface of the bearing half 18a; and the semi-sleeve 17b is provided with a dowel pin 24b projecting outwardly from the outer surface of the semi-sleeve, and adapted for fitting in a socket formed in the inner surface of the bearing block half 18b; the dowel pins 24a and 24b, and their respective sockets, being so spaced circumferentially with reference to the longitudinal joints between the semi-sleeves 17a and 17b, that the semi-sleeve joints are circumferentially spaced from the bearing block joints.

The semi-sleeves 17a and 17b, in a manner similar to the method of making the semi-sleeves 11a and 11b, are preferably made by longitudinally cutting a tube along an axial plane thereof, and then accurately finishing as by grinding the longitudinally extending base surfaces 25a and 25'a of the semi-sleeve 17a, and the longitudinally extending base surfaces 25b and 25'b of the semi-sleeve 17b, so that the surfaces 25a and 25'a are accurately plane and lie in the same plane, and so that the surfaces 25b and 25'b are accurately plane and lie in the same plane, whereby the surfaces 25a and 25'a will accurately abut and fit the surfaces 25b and 25'b, respectively.

The semi-sleeves 17a and 17b are then clamped in a suitable fixture with the surfaces 25a and 25'a abutting and fitting the surfaces 25b and 25'b, and the outer mutually continuous semi-cylindric surfaces of the semi-sleeves are accurately finished as by grinding to fit within the inner semi-cylindric surfaces of the separable bearing block halves 18a and 18b, respectively, as aforesaid, so that the joints of the bearing block and of the sleeve will be circumferentially spaced from each other, as illustrated in Fig. 1.

With the semi-sleeve 17a and 17b still clamped in the fixture, a plurality of laterally spaced inwardly opening annular groove raceways 26 are finished as by grinding in the inner surface of the outer raceway sleeve, the lateral spacing and cross-section of the raceways 26 corresponding with the lateral spacing and cross-section of the raceways 15 of the inner raceway sleeve.

A set of circumferentially spaced rolling members 27, is interposed between each pair of opposite inner and outer groove raceways 15 and 26 for rolling therein and for transmitting thrusts and axial loads from one raceway sleeve and abutting parts to the other raceway sleeves and abutting parts. In the present instance the rolling members 27 are balls, but if suitable modifications are made in the cross-sections of the groove raceways, cylindric rolling members or tapered rolling members may be utilized.

A cylindric cage comprising separable semi-cages 28a and 28b is provided for retaining, and for circumferentially and laterally spacing the ball rolling members 27.

The ball rolling members 27 are retained in each semi-cage by punching therein suitably spaced cylindric apertures 28 of a larger diameter than the ball diameters, as indicated in full lines in Fig. 7, by placing a ball in each aperture; and by pressing towards each other, inner and outer peripheral bands of the cage material about the ends of the cylindric apertures, as indicated in dot and dash lines in Fig. 7 and in full lines in Figs. 1 and 2, thus forming spherical apertures retaining the balls.

A clearance is provided between the outer surface of the inner raceway sleeve and the inner surface of the cage and between the outer surface of the cage and the inner surface of the outer raceway sleeve, thus permitting circumferential movement of the cage with reference to the inner and outer raceway sleeves, whereby the properly spaced ball rolling members 27 may roll without friction between the raceway sleeves, which in use are themselves rotating about their common longitudinal axis with different velocities.

The inner surface of the cage formed by the semi-cages 28a and 28b is provided with a groove 29 into which the outwardly extending semi-ring flanges 16a and 16b slidably extend, whereby the cage is prevented from lateral movement with reference to the inner raceway sleeve, thereby eliminating the friction which would otherwise be set up between the rolling members and the cage.

Although the rolling members rolling in the outer groove raceways prevent lateral movement of the outer raceway sleeve with reference to the inner raceway sleeve and the cage; if desired, the semi-cages 28a and 28b may be provided, respectively, with outwardly protruding semi-ring flanges or flange tongues 30a and 30b arranged, similar to the ring flanges 16a and 16b, with one end of each ring flange overlapping the adjacent semi-cage.

The ring flange thus formed by the semi-ring flanges 30a and 30b slidably extends into an annular groove 31 provided in the inner surface of the outer raceway sleeve.

Separable anti-friction bearings constructed in accordance with the present invention are thus relatively easy to manufacture, and the several parts of the bearings interengage with each other so that only the bearing block bolts are required for securing and joining the bearing parts together for use.

Rotation of the cage independently of the relative rotary movements of the inner and outer raceway sleeves, is necessary for successful operation of a bearing of the type of the present invention; and the interengaging flanges and grooves on the raceway sleeves and the cage permit this desirable circumferential movement of the cage, and prevent the undesirable axial movement thereof.

Positioning the joints between the outer raceway semi-sleeves circumferentially spaced from the joints between the bearing block halves, permits the bearing block bolts to be tightened to any degree desired without distorting the raceways, as would occur if the raceway sleeve joints were in the same plane with the bearing block joints.

I claim:

1. An anti-friction bearing including an outer raceway sleeve, separable semi-sleeves comprising an inner raceway sleeve, a flange tongue on each of the semi-sleeves arcuately overlapping the other semi-sleeve, means forming a guideway for the flange tongues, opposed raceways in the sleeves, rolling members rolling in and interposed between the raceways, a separable bearing block securing the outer raceway sleeve, a shaft mounted in the inner raceway sleeve and secured thereto, and means maintaining the joints in the outer raceway sleeve and the joints in the separable bearing block circumferentially spaced from each other.

2. An anti-friction bearing including an inner raceway sleeve, an outer raceway sleeve, opposed raceways in the sleeves, rolling members rolling in and interposed between the raceways, a cage spacing the rolling members, and means positioned at the outer periphery of the cage intermediate its ends permitting rotation of the cage independently of the raceway sleeves and preventing axial displacement of the cage with respect to the sleeves.

3. An anti-friction bearing including an outer raceway sleeve, separable semi-sleeves comprising an inner raceway sleeve, a arcuate flange tongue on each of the semi-sleeves arcuately overlapping the other semi-sleeve, opposed raceways in the sleeves, rolling members rolling in and interposed between the raceways, a cage spacing the rolling members, a shaft mounted in the inner raceway sleeve and secured thereto, and there being an annular groove in the cage into which the arcuate flange tongues extend for permitting rotation of the cage independently of the raceway sleeves and preventing axial displacement of the cage with respect to the sleeves.

4. An anti-friction bearing including an inner raceway sleeve, a shaft mounted within the sleeve and secured thereto, an outer raceway sleeve, a separable bearing block securing the outer raceway sleeve, rolling members rolling in and interposed between the raceway sleeves, a cage spacing the rolling members, the inner and outer sleeves and the cage extending substantially throughout the length of the bearing, and means intermediate the ends of the cage preventing axial displacement of the cage with respect to the sleeves.

5. An anti-friction bearing including an inner raceway sleeve, a shaft mounted within the sleeve and secured thereto, an outer raceway sleeve, a separable bearing block securing the outer raceway sleeve, rolling members rolling in and interposed between the raceway sleeves, a cage spacing the rolling members, the inner and outer sleeves and the cage extending substantially throughout the length of the bearing and means intermediate the ends of the cage preventing axial displacement of the cage with respect to the sleeves and permitting axial rotation of the cage independently of the sleeves.

6. An anti-friction bearing including an inner raceway sleeve, a shaft mounted within the sleeve and secured thereto, an outer raceway sleeve, a separable bearing block securing the outer raceway sleeve, rolling members rolling in and interposed between the raceway sleeves, a cage spacing the rolling members, the inner and outer sleeves and the cage extending substantially throughout the length of the bearing, and means projecting from the outer periphery of the cage intermediate its ends and engaging the outer sleeve preventing axial displacement of the cage with respect to the sleeves and permitting axial rotation of the cage independently of the sleeves.

In testimony that I claim the above, I have hereunto subscribed my name.

CLARENCE E. BEST.